United States Patent
Floyd et al.

(10) Patent No.: US 6,631,463 B1
(45) Date of Patent: Oct. 7, 2003

(54) METHOD AND APPARATUS FOR PATCHING PROBLEMATIC INSTRUCTIONS IN A MICROPROCESSOR USING SOFTWARE INTERRUPTS

(75) Inventors: Michael Stephen Floyd, Leander, TX (US); James Allan Kahle, Austin, TX (US); Hung Qui Le, Austin, TX (US); John Anthony Moore, Cedar Park, TX (US); Kevin Franklin Reick, Austin, TX (US); Edward John Silha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,103

(22) Filed: Nov. 8, 1999

(51) Int. Cl.$^7$ .................................................. G06F 9/00
(52) U.S. Cl. ........................................ 712/227; 712/244
(58) Field of Search ............................ 717/129; 714/34, 714/35; 703/26, 27; 712/227, 244

(56) References Cited

U.S. PATENT DOCUMENTS

| | | | | |
|---|---|---|---|---|
| 4,074,353 A | * | 2/1978 | Woods et al. ................ 710/264 |
| 4,167,778 A | * | 9/1979 | Sipple ........................ 712/208 |
| 4,231,106 A | | 10/1980 | Heap et al. .................. 364/900 |
| 5,151,981 A | | 9/1992 | Westcott et al. ............. 395/375 |
| 5,333,297 A | * | 7/1994 | Lemaire et al. ............. 710/200 |
| 5,446,876 A | | 8/1995 | Levine et al. .......... 395/184.01 |
| 5,493,659 A | * | 2/1996 | Kurakazu et al. ............ 712/244 |
| 5,493,673 A | | 2/1996 | Rindos, III et al. .......... 395/550 |
| 5,528,753 A | | 6/1996 | Fortin .................... 395/183.11 |
| 5,557,548 A | | 9/1996 | Gover et al. ............. 364/551.01 |
| 5,572,672 A | | 11/1996 | Dewitt et al. ........... 395/184.01 |
| 5,574,873 A | * | 11/1996 | Davidian ...................... 703/26 |
| 5,732,234 A | * | 3/1998 | Vassiliadis et al. .......... 712/200 |
| 5,748,855 A | | 5/1998 | Levine et al. .......... 395/800.23 |
| 5,790,843 A | | 8/1998 | Borkenhagen et al. ....... 395/567 |
| 5,809,450 A | | 9/1998 | Chrysos et al. .............. 702/186 |
| 6,006,030 A | * | 12/1999 | Dockser ...................... 712/227 |
| 6,049,868 A | * | 4/2000 | Panwar ........................ 712/244 |
| 6,052,777 A | * | 4/2000 | Panwar ........................ 712/244 |
| 6,135,651 A | * | 10/2000 | Leinfelder et al. ........... 717/168 |
| 6,412,081 B1 | * | 6/2002 | Koscal et al. ................ 710/266 |

* cited by examiner

Primary Examiner—Eric Coleman
(74) Attorney, Agent, or Firm—Duke W. Yee; Thomas E. Tyson; Stephen J. Walder, Jr.

(57) ABSTRACT

A method and apparatus for patching a problematic instruction within a pipelined processor in a data processing system is presented. A plurality of instructions are fetched, and the plurality of instructions are matched against at least one match condition to generate a matched instruction. The match conditions may include matching the opcode of an instruction, the pre-decode bits of an instruction, a type of instruction, or other conditions. A matched instruction may be marked using a match bit that accompanies the instruction through the instruction pipeline. The matched instruction is then replaced with an internal opcode or internal instruction that causes the instruction scheduling unit to take a special software interrupt. The problematic instruction is then patched through the execution of a set of instructions that cause the desired logical operation of the problematic instruction.

30 Claims, 5 Drawing Sheets

| V0 VALUE | V1 VALUE | MEANING |
|---|---|---|
| 0 | 0 | NEVER MATCH |
| 0 | 1 | MATCH A ONE (1) |
| 1 | 0 | MATCH A ZERO (0) |
| 1 | 1 | ALWAYS MATCH |

METHOD AND APPARATUS FOR PATCHING PROBLEMATIC INSTRUCTIONS IN A MICROPROCESSOR USING SOFTWARE INTERRUPTS

CROSS-REFERENCE TO RELATED APPLICATIONS

The present invention is related to the following applications entitled "METHOD AND APPARATUS FOR INSTRUCTION SAMPLING FOR PERFORMANCE MONITORING AND DEBUG", U.S. application Ser. No. 09/435,069, now Pat. No. 6,574,727, filed on Nov. 4,1999; and "METHOD AND APPARATUS FOR IDENTIFYING INSTRUCTIONS FOR PERFORMANCE MONITORING IN A MICROPROCESSOR", U.S. application Ser. No. 09/436,109, now U.S. Pat. No. 6,539,502, filed on Nov. 8, 1999; all of which are assigned to the same assignee.

BACKGROUND OF THE INVENTION

1. Technical Field

The present invention relates generally to an improved data processing system and, in particular, to a method and apparatus for instruction processing architecture and instruction processing control within a processor in a data processing system, and more particularly, processing control with specialized instruction processing in support of testing and debugging.

2. Description of Related Art

Modern processors commonly use a technique known as pipelining to improve performance. Pipelining is an instruction execution technique that is analogous to an assembly line. Instruction execution often involves the sequential steps of fetching the instruction from memory, decoding the instruction into its respective operation and operand(s), fetching the operands of the instruction, applying the decoded operation on the operands (herein simply referred to as "executing" the instruction), and storing the result back in memory or in a register. Pipelining is a technique wherein the sequential steps of the execution process are overlapped for a subsequence of the instructions. For example, while the CPU is storing the results of a first instruction of an instruction sequence, the CPU simultaneously executes the second instruction of the sequence, fetches the operands of the third instruction of the sequence, decodes the fourth instruction of the sequence, and fetches the fifth instruction of the sequence. Pipelining can thus decrease the execution time for a sequence of instructions.

Another technique for improving performance involves executing two or more instructions in parallel, i.e., simultaneously. Processors that utilize this technique are generally referred to as superscalar processors. Such processors may incorporate an additional technique in which a sequence of instructions may be executed out of order. Results for such instructions must be reassembled upon instruction completion such that the sequential program order or results are maintained. This system is referred to as out-of-order issue with in-order completion.

The ability of a superscalar processor to execute two or more instructions simultaneously depends upon the particular instructions being executed. Likewise, the flexibility in issuing or completing instructions out-of-order can depend on the particular instructions to be issued or completed. There are three types of such instruction dependencies, which are referred to as: resource conflicts, procedural dependencies, and data dependencies. Resource conflicts occur when two instructions executing in parallel tend to access the same resource, e.g., the system bus. Data dependencies occur when the completion of a first instruction changes the value stored in a register or memory, which is later accessed by a later completed second instruction.

During execution of instructions, an instruction sequence may fail to execute properly or to yield the correct results for a number of different reasons. For example, a failure may occur when a certain event or sequence of events occurs in a manner not expected by the designer. Further, an error also may be caused by a misdesigned circuit or logic equation. Due to the complexity of designing an out-of-order processor, the processor design may logically mis-process one instruction in combination with another instruction, causing an error. In some cases, a selected frequency, voltage, or type of noise may cause an error in execution because of a circuit not behaving as designed. Errors such as these often cause the scheduler in the microprocessor to "hang", resulting in execution of instructions coming to a halt. Even worse, these errors can cause the processor to obtain an incorrect answer or to corrupt the data being processed.

Once an error is diagnosed, it may be difficult to introduce a repair or patch that allows the processor, which has already been manufactured, to continue operating such that it does not repeatedly encounter the diagnosed error.

Therefore, it would be advantageous to have a method and apparatus for preventing processing errors in an operational microprocessor in spite of errors or flaws in a hardware design.

SUMMARY OF THE INVENTION

A method and apparatus for patching a problematic instruction within a pipelined processor in a data processing system is presented. A plurality of instructions are fetched, and the plurality of instructions are matched against at least one match condition to generate a matched instruction. The match conditions may include matching the opcode of an instruction, the pre-decode bits of an instruction, a type of instruction, or other conditions. A matched instruction may be marked using a match bit that accompanies the instruction through the instruction pipeline. The matched instruction is then replaced with an internal opcode or internal instruction that causes the instruction scheduling unit to take a special software interrupt. The problematic instruction is then patched through the execution of a set of instructions that cause the desired logical operation of the problematic instruction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
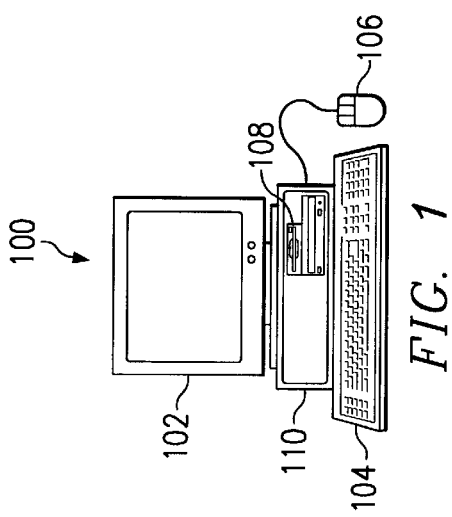
FIG. 1 is a pictorial representation depicting a data processing system in which the present invention may be implemented.

With reference now to FIG. 1, a pictorial representation depicts a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer. Although the depicted representation shows a personal computer, other embodiments of the present invention may be implemented in other types of data processing systems, such as mainframes, workstations, network computers, Internet appliances, hand-held computers, etc. System unit 110 comprises memory, a central processing unit, I/O unit, etc. However, in the present invention, system unit 110 contains a speculative processor, either as the central processing unit or as one of multiple CPUs present in the system unit.

Figure 2:
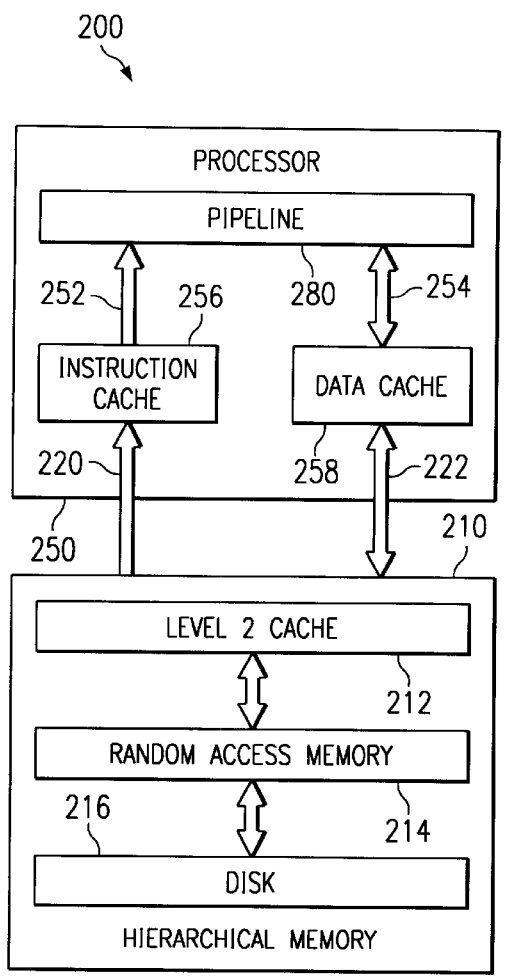
FIG. 2 is a block diagram depicting selected, internal, functional units of a data processing system for processing information.

With reference now to FIG. 2, a block diagram depicts selected internal functional units of a data processing system for processing information in accordance with a preferred embodiment of the present invention. System 200 comprises hierarchical memory 210 and processor 250. Hierarchical memory 210 comprises Level 2 cache 212, random access memory (RAM) 214, and disk 216. Level 2 cache 212 provides a fast access cache to data and instructions that may be stored in RAM 214 in a manner which is well-known in the art. RAM 214 provides main memory storage for data and instructions that may also provide a cache for data and instructions stored on non-volatile disk 216.

Data and instructions may be transferred to processor 250 from hierarchical memory 210 on instruction transfer path 220 and data transfer path 222. Transfer path 220 and data transfer path 222 may be implemented as a single bus or as separate buses between processor 250 and hierarchical memory 210. Alternatively, a single bus may transfer data and instructions between processor 250 and hierarchical memory 210 while processor 250 provides separate instruction and data transfer paths within processor 250, such as instruction bus 252 and data bus 254.

Processor 250 also comprises instruction cache 256, data cache 258, and instruction pipeline 280. Processor 250 includes a pipelined processor capable of executing multiple instructions in a single cycle, such as the PowerPC family of reduced instruction set computing (RISC) processors. During operation of system 200, instructions and data are stored in hierarchical memory 210. Instructions to be executed are transferred to instruction pipeline 280 via instruction cache 256. Instruction pipeline 256 decodes and executes the instructions that have been staged within the pipeline. Some instructions transfer data to or from hierarchical memory 210 via data cache 258. Other instructions may operate on data loaded from memory or may control the flow of instructions.

In the present invention, processor 250 allows instructions to execute out-of-order with respect to the order in which the instructions were coded by a programmer or were ordered during program compilation by a compiler. Processor 250 also employs speculative execution to predict the outcome of conditional branches of certain instructions before the data on which the certain instructions depend is available.

Since speculative instructions can not complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of the conditional branch.

Figure 3:
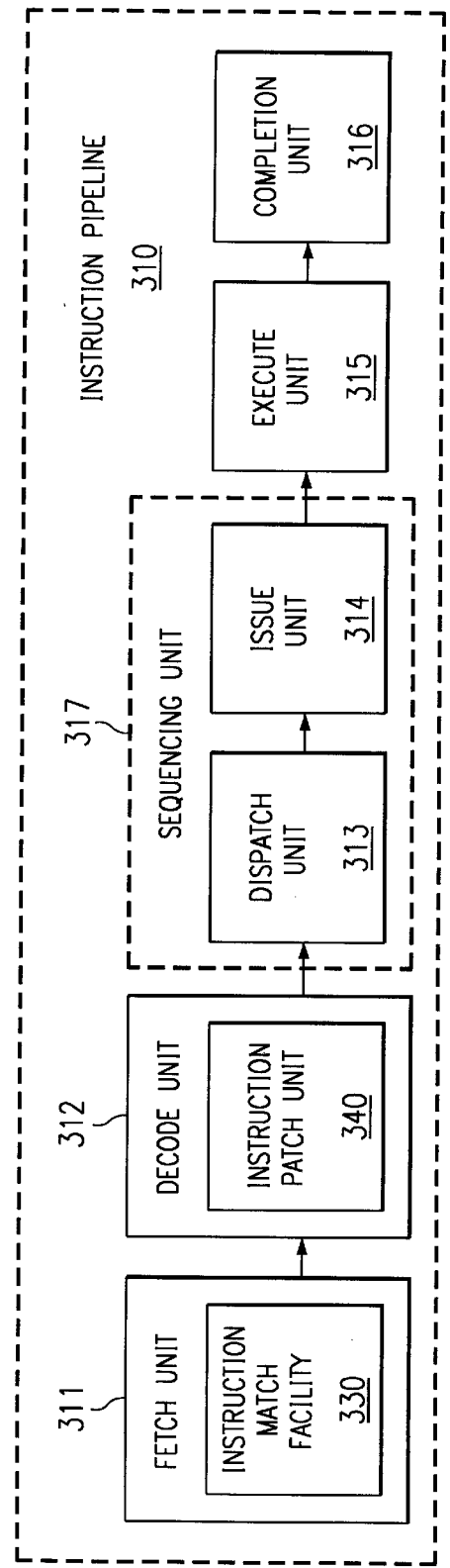
FIG. 3 is a diagram illustrating an instruction pipeline that may be used to process instructions.

With reference now to FIG. 3, a diagram illustrates an instruction pipeline that may be used to process instructions. Units 311–316 depict individual stages of an instruction pipeline. Fetch unit 311 fetches instructions from memory, and decode unit 312 decodes the instructions to determine the type of instruction, its operands, and the destination of its result. Dispatch unit 313 requests operands for an instruction, and issue unit 314 determines that an instruction may proceed with execution. Execute unit 315 performs the operation on the operands as indicated by the type of instruction. Completion unit 316 deallocates any internal processor resources such as the commitment of registers, that were required by the instruction. Depending upon system implementation, an instruction pipeline may have more or less stages. For example, the functions of dispatch unit 313 and issue unit 314 may be performed by a single unit, such as a scheduling unit or sequencing unit 317.

Fetch unit 311 contains instruction match facility 330. Instruction matching is a technique in which a single instruction is chosen, i.e. matched, and other processes may then be performed on a matched instruction. Alternatively, instructions may be matched in the decode stage of the processor pipeline. In instruction pipeline 310 shown in FIG. 3, the instruction match facility 330 is embedded within fetch unit 311.

Once an instruction is matched, the instruction is "marked" with a match bit that accompanies the instruction through the instruction pipeline. As the matched instruction flows through each pipeline unit or each stage of the instruction pipeline, a non-zero match bit serves as an indication that the instruction within the unit is a matched instruction.

Decode unit 312 contains instruction patch unit 340, which uses the match bit of a matched instruction to determine which instructions in the instruction stream require patching, as is described in more detail further below.

Figure 4:
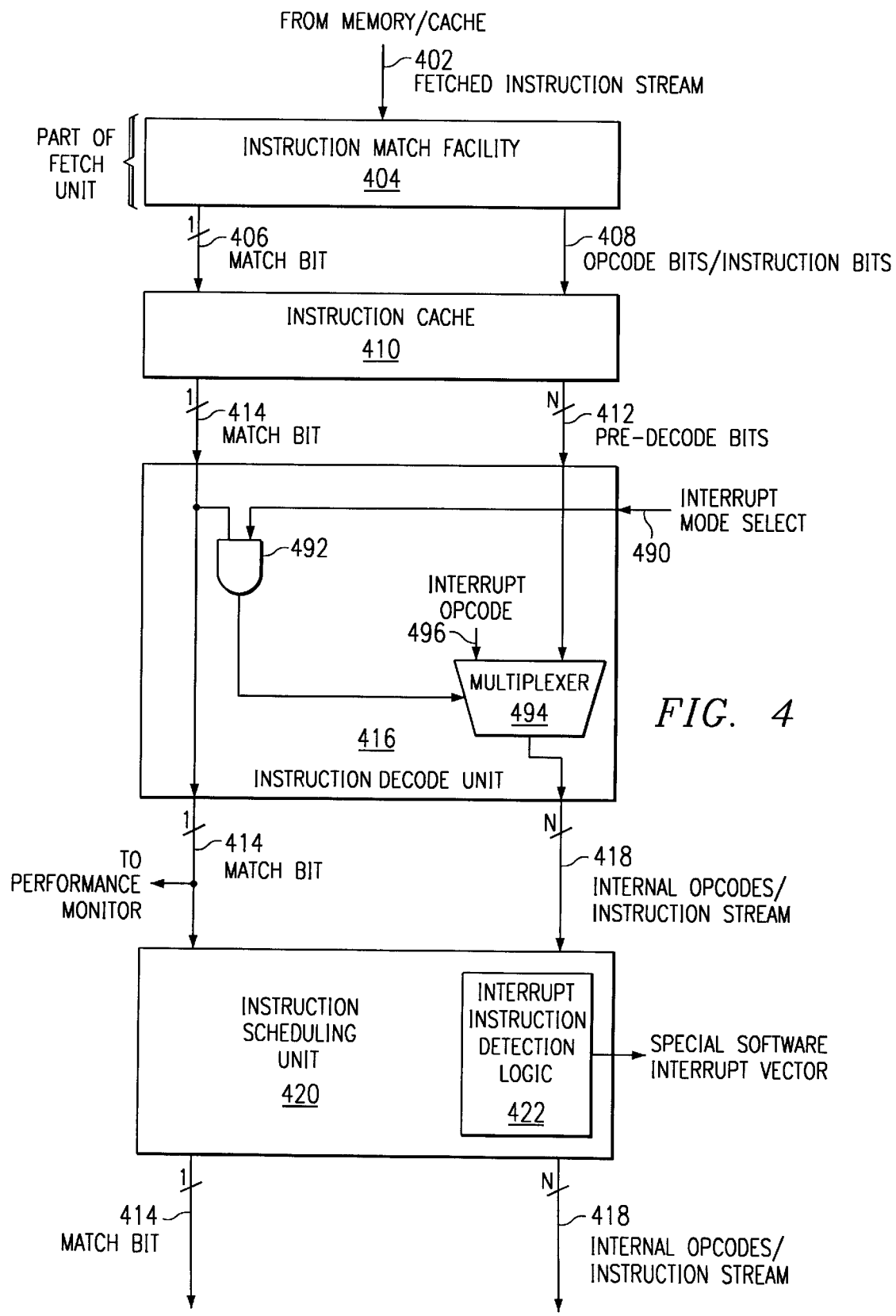
FIG. 4 is a block diagram depicting components within an instruction pipeline for selectively matching and patching instructions from a population of instructions.

With reference now to FIG. 4, a block diagram depicts components within an instruction pipeline for selectively matching instructions from a population of instructions.

Fetched instruction stream 402 is retrieved from main memory or Level 2 cache under the control of the fetch unit within the instruction pipeline. Before placing the fetched instructions into the instruction cache, the fetched instructions are passed through instruction match facility 404, which may be contained within the fetch unit or may be otherwise within the fetch logic prior to placement of the fetched instruction stream into the instruction cache. Alternatively, instruction match facility 404 is contained within the decode unit, and instructions are matched after they are retrieved from the instruction cache. As another alternative, instructions that pass through instruction match facility 404 may bypass the instruction cache and flow directly into the instruction pipeline.

Instruction match facility 404 may be used to identify instructions by their opcode and/or extended opcode by matching the fetched instructions against selected opcodes. The matching function may be performed through the use of one or more mask registers. A matched instruction is signified through a bit in the pre-decode information that is stored with the instruction in the instruction cache. Match bit 406 and opcode/instruction bits 408 are then stored in instruction cache 410 until selection for progress through the remainder of the instruction pipeline. As long as the instruction resides in the Level 1 instruction cache, its match bit remains unchanged. If the match condition being used by instruction match facility 404 changes while previously matched instructions reside within instruction cache 410, the Level 1 instruction cache should be flushed to ensure that the match bit is properly set for all instructions preparing to enter the remainder of the instruction pipeline. Otherwise, instructions residing within instruction cache 410 will have been matched using more than one condition, possibly introducing inaccuracies into at subsequent locations within the instruction pipeline.

As instructions are retrieved from instruction cache 410, decode unit 416 may expand or replace one or more of the opcodes of the architected instruction, i.e. the original instruction retrieved for an executing program, with an expanded stream or replacement stream of instructions 418 consisting of one or more internal instructions with internal opcodes (IOPs). These internal opcodes form some or all of pre-decode bits 412. In the example shown in FIG. 4, pre-decode bits 412 consists of N bits. One or more of the pre-decode bits may classify the instruction. For example, there may be several branch instructions in the architected instruction set that may be categorized using a pre-decode bit, so that 16 branch instructions are classified by setting a single pre-decode bit. These pre-decode bits may then be used by an execution unit at a later point in the instruction pipeline.

As an internal opcode flows through the instruction pipeline, its associated match bit 414 flows with the instruction through the instruction pipeline. Instruction scheduling unit 420 then prepares the instruction and/or other processor resources for execution of the instruction, such as moving instruction operands if necessary.

Decode unit 416 also accepts a variety of mode signals for selectable functionality, such as interrupt mode select 490. When the interrupt mode select signal is received, the next matched instruction is used to replace an instruction or opcode with a special interrupt opcode. A matched instruction is indicated by match bit 414, and the next matched instruction after the receipt of interrupt mode select 490 is detected by ANDing interrupt mode select signal 490 and match bit 414 with AND gate 492 to provide a control input into multiplexer 494 that selects interrupt opcode 496 rather than an instruction or internal opcode already in the instruction stream. The output of the multiplexer then represents the instruction stream. The replacement with the interrupt opcode is not the only functionality present within decode unit 416, and decode unit 416 may perform other processing (not shown) on the instruction stream.

Interrupt mode select signal 490 provides an input for selecting for the replacement of an opcode with an interrupt opcode in the instruction stream in conjunction with match bit 414. In this manner, an instruction or internal opcode within the instruction stream may be identified or matched and then replaced with a special interrupt opcode than causes instruction scheduling unit 420 to take an interrupt as specified by interrupt opcode 496 when the interrupt opcode is subsequently detected by interrupt instruction detection logic 422.

The execution of the interrupt opcode then causes the execution of software instructions in a special software interrupt handler specified by a software interrupt vector that allows software to work around hardware bugs by patching instructions that do not work properly with a different combination of working instructions that perform the same logical operation on the data.

In some debugging situations, it is possible to replace the problematic instruction with a stream of different micro-coded internal opcodes to emulate the problematic instruction. However, there may be several cases in which this is not possible. For example, the replacement microcode stream may not fit in an appropriate microcode table because there are too many new instructions to be patched into the instruction stream. In other cases, the required patch may fix a problem which requires the use of software code, e.g. resolution of a complicated case/branch structure or retrieval of information from operating system data structures. As another example, the required patch may be dependent upon instruction context so that software code must examine the current context at the time that the instruction appears and choose an appropriate workaround.

Rather than being preconfigured within decode unit 416, interrupt opcode 496 may also be input into instruction decode unit 416 to provide for the selection of a variety of special interrupts. Interrupt opcode 496 and interrupt mode select 490 may be under the control of a system engineer, configuration hardware, or configuration software, thereby providing for software control with respect to the replacement of an instruction with an interrupt-causing instruction. For example, the interrupt opcode could be initialized into some type of non-volatile RAM at setup time using the scan clocks. After the hardware is configured, configuration software could enable a system engineer to select certain functionality associated with the interrupts. The manner in which the system is initialized or configured may vary depending upon system implementation.

Figures 5A, 5C:
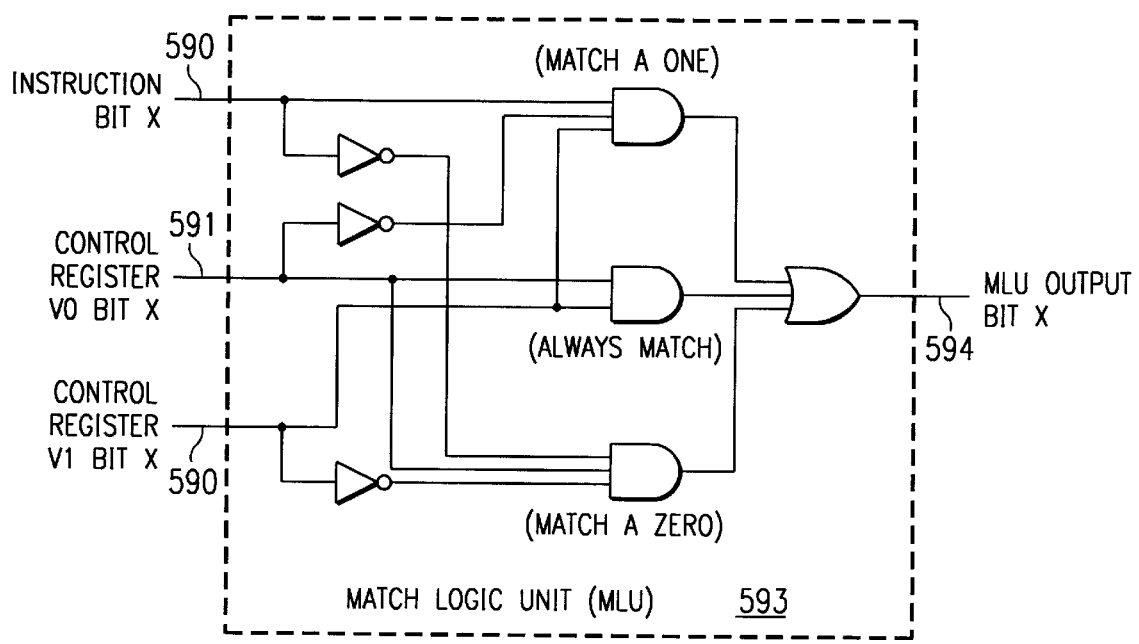
FIG. 5A is a table showing the logic operations to be performed in a bitwise manner on the opcode of a fetched instruction.
FIG. 5C is a diagram depicting a logic circuit that may be used to perform the bitwise logic operation on instruction bits.

With reference now to FIG. 5A, a table shows the logic operations to be performed in a bitwise manner on the opcode of a fetched instruction. One or more pairs of match values stored in control registers are allocated for use in instruction matching. These pairs, referred to as V0 and V1, are used together to filter instructions for instruction matching. The pair(s) of match values may be initialized at system configuration or during bootup. During the fetch or decode stage, the instruction word is compared bit by bit to the V0 and V1 pair(s). For each bit in the instruction word, the corresponding bit in V0 and V1 are used to determine if a match exists, as shown in FIG. 5A.

If every bit position in the instruction word results in a match, the instruction is becomes a "matched instruction". If any bit position does not match, the instruction will not be matched. The V0 and V1 registers can be any size up to and including the size of an instruction word. If a full word compare is not required, smaller registers can be used. For example, less than the full instruction word is sufficient to uniquely identify a type of instruction, but additional bits may be required if additional information, such as source or destination registers, are included in the compare. If necessary to match against a long instruction word, more than one pair of registers can be used, in which case the comparison continues until there are not any more V0/V1 matching bits.

Figure 5B:
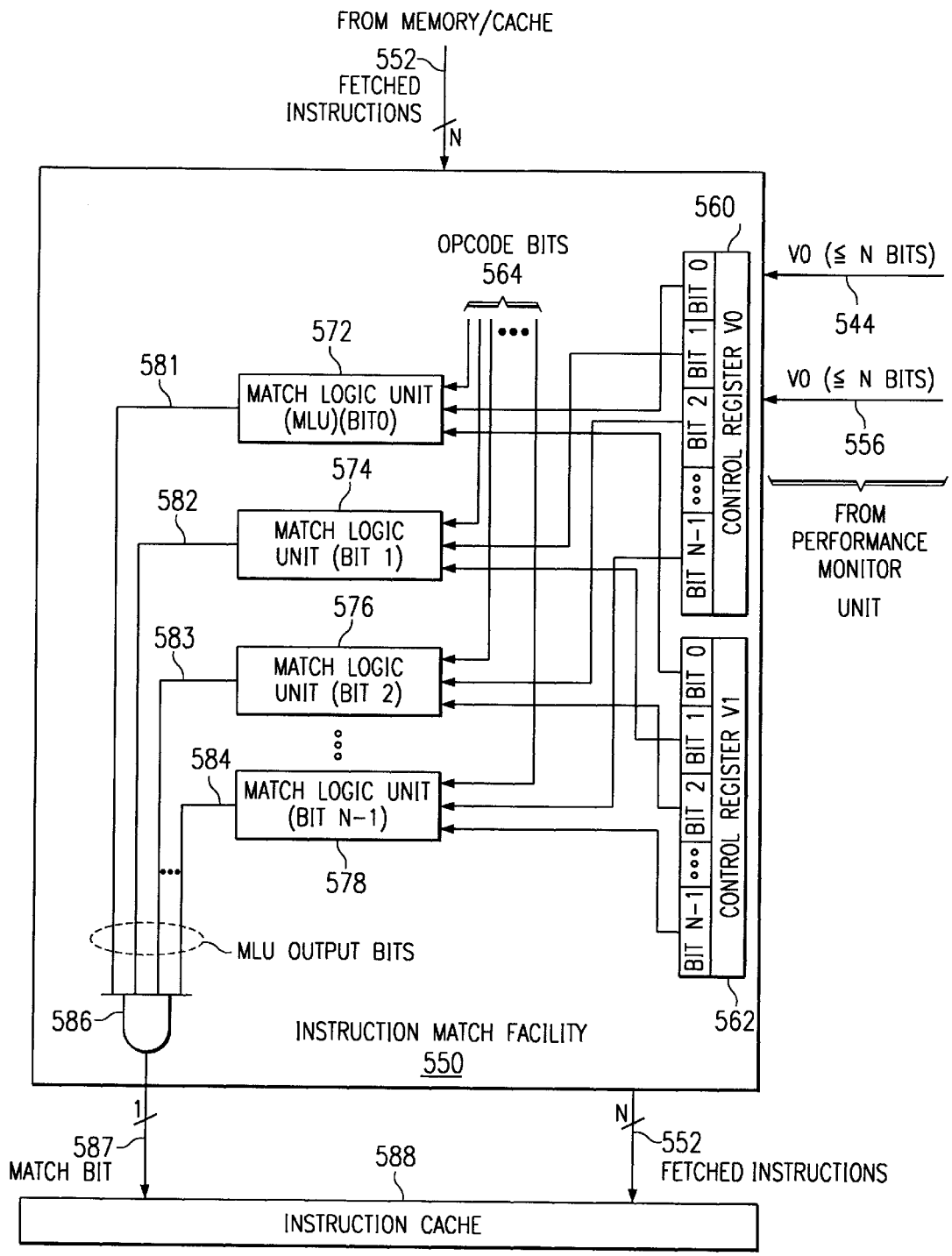
FIG. 5B is a block diagram depicting the components that may be used to construct an instruction match facility.

With reference now to FIG. 5B, a block diagram depicts the components that may be used to construct an instruction match facility. While the instruction match facility is shown in FIG. 5A in the path between memory/cache and the instruction cache prior to entering the decode unit, e.g., as part of the fetch unit, the instruction match facility may be included as part of the decode unit.

Instruction match facility 550 receives fetched instructions 552 that are input from memory/cache. In the example shown, the opcode of a fetched instruction consists of N bits. However, the match operation may be performed on the full instruction word or may be performed on only a subset of the instruction word. Instruction match facility 550 also accepts V0 match value 554 and V1 match value 556, which may originate, for example, from scan latches under control of a JTAG interface. Instruction match facility 550 stores match values 554 and 556 in control register V0 560 and control register V1 562, respectively. Each bit in control register V0 560 and control register V1 562 are bitwise fed into match logic units 572–578 in conjunction with the bitwise input of opcode bits 564 from a fetched instruction.

Match logic units 572–578 perform a match logic operation as appropriate for determining some of the instructions in the instruction stream as being eligible for selection as matched instructions. Match logic units 572–578 generate MLU output bits 581–584 that are combined by AND gate 586 in order to generate a single match bit 587. The match bit generated by instruction match facility 550 for a particular instruction is stored in association with its particular instruction in instruction cache 588.

With reference not to FIG. 5C, a diagram depicts a logic circuit that may be used to perform the bitwise logic operation on instruction bits. Instruction bit X 590, control register V0 bit X 591, and control register V1 bit X 592 are fed into match logic unit (MLU) 593. The match logic unit uses the appropriate combinational logic circuit to perform the desired logic operation on the instruction opcode in conjunction with the bit values in control registers V0 and V1. The match logic unit then generates MLU output bit X 594 that represents whether the specified bit in the instruction matched the desired value or logic operation as controlled by the control registers. As one of ordinary skill in the art would understand, the combinational logic circuit may vary in accordance with the desired logic operation to be performed on the instruction in order to select appropriate instructions as matched instructions in the instruction stream flowing through the instruction pipeline.

Figure 6:
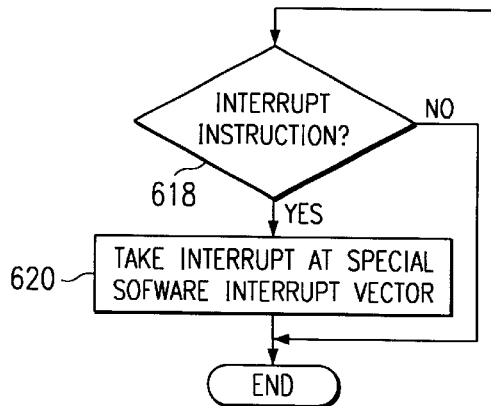
FIG. 6 is a flowchart depicting a process for replacing selecting instructions with an interrupt instruction in an instruction pipeline in accordance with a preferred embodiment of the present invention.
Figure 6:
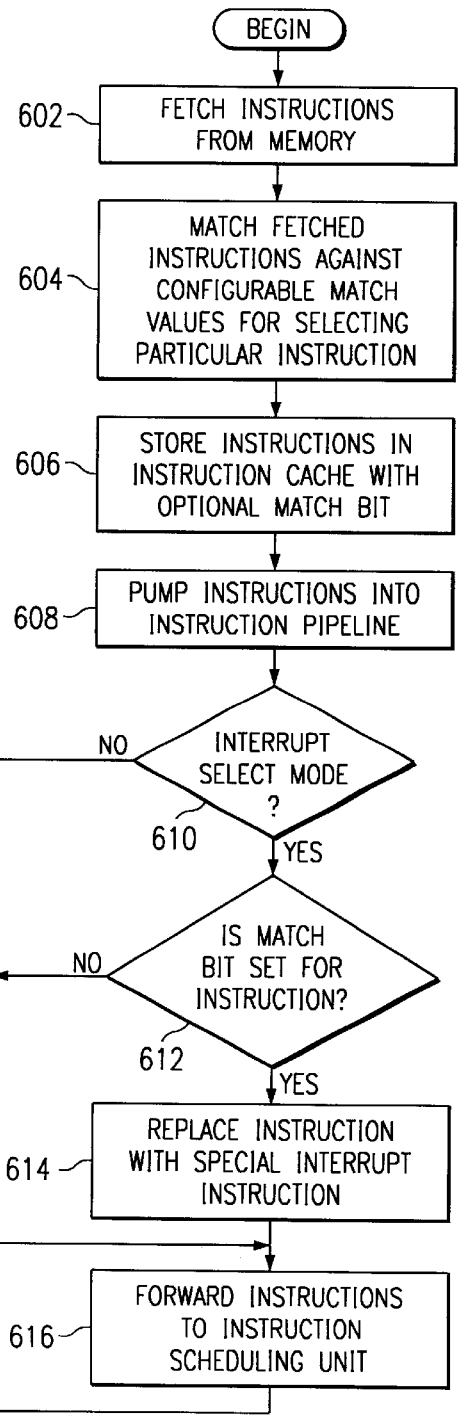

With reference now to FIG. 6, a flowchart depicts a process for replacing selecting instructions with an interrupt instruction in an instruction pipeline in accordance with a preferred embodiment of the present invention. The process begins when instructions are fetched from memory or cache (step 602). The instructions are then matched against configurable match values to select a particular instruction as a matched instruction (step 604). The instructions are then stored in the instruction cache along with a match bit, if necessary (step 606). Alternatively, the instructions bypass the instruction cache and flow directly into the instruction pipeline.

An instruction stream is pumped into the instruction pipeline (step 608) in which the next unit may be an instruction decode unit. A determination is then made as to whether the interrupt select mode signal has been asserted (step 610). If not, then the processing of the instruction stream continues. If so, then a determination is made as to whether the match bit is set for an instruction that is currently being processed (step 612). If not, then the processing of the instruction stream continues. If so, then a current instruction is replaced with a special interrupt instruction (step 614), and the processing of the instruction stream continues.

The instruction is then sent to the instruction scheduling unit (step 616), which determines whether the current instruction in the instruction stream is an interrupt instruction (step 618). If so, then the instruction scheduling unit takes the special interrupt (step 620) and begins execution of a software interrupt routine as specified by the special interrupt instruction in conjunction with an interrupt vector table. The process of matching and replacing an instruction is then complete.

If the instruction is not an interrupt instruction, then the processing of the instruction stream with respect to special interrupt processing is complete. It should be noted that the process described in FIG. 6 focuses on the steps associated with a single instruction, and each unit in the instruction pipeline "loops" in a state of continuous processing of the instruction stream while the system clock is running.

The advantages provided by the present invention are apparent in light of the detailed description of the invention provided above. The flexibility provided by the present invention in the manner of selectively matching problematic instructions and patching those problematic instructions with interrupts allows for fine granularity and control for precise instruction debug. This reduces the amount of time that a company spends in the debugging stage while developing a microprocessor, thereby reducing the amount of time that is required to bring a new product to market.

In addition, the instruction matching and patching facility provides for dynamic hardware debugging and patching to reduce customer downtime. Special instruction debugging may be configured in a customer's system in order to watch for the execution of a particular instruction pattern that is believed to be intermittently problematic. If the interrupt is tripped, then special diagnostic software may quickly log the problem while simultaneously patching the problematic instruction or instructions with a software patch. In this manner, a problem may be patched and logged without any significant reduction in the processing efficiency of the customer's system.

It is important to note that while the present invention has been described in the context of a fully functioning data processing system, those of ordinary skill in the art will appreciate that the processes of the present invention are capable of being distributed in the form of a computer readable medium of instructions, including microcode, and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing instructions within a pipelined processor, the method comprising the steps of:
    fetching an instruction;
    matching an instruction using at least one match condition, wherein the match condition identifies instructions which are to be patched;
    marking an instruction as a matched instruction by setting a match bit;
    passing the match bit associated with the matched instruction through the pipelined processor with the matched instruction;
    replacing the matched instruction with an interrupt instruction; and
    patching the marked instruction, using an interrupt handler based on the interrupt instruction, by replacing the marked instruction with one or more other instructions that perform a same logical operation on data as the marked instruction.

2. The method of claim 1 wherein the matched instruction is replaced in response to a selection of an instruction interrupt mode.

3. The method of claim 1 wherein the interrupt instruction is executed in conjunction with a software interrupt vector to invoke a software interrupt handler.

4. The method of claim 1 wherein an instruction is matched based on an instruction opcode.

5. The method of claim 1 wherein an instruction is matched based on an instruction classification.

6. The method of claim 5 wherein the instruction classification is selected from the group consisting of instruction type, instruction opcode, instruction operand source, or instruction operand destination.

7. The method of claim 1 further comprising:
    fetching a plurality of instructions from a memory or a cache;
    filtering the plurality of instructions using a match value against each instruction in the plurality of instructions to generate a subset of matched instructions; and
    storing the matched instructions in an instruction cache.

8. The method of claim 7 further comprising:
    setting a match bit for each matched instruction in the subset of matched instructions;
    associatively storing the match bit for each matched instruction in the instruction cache with the matched instructions.

9. The method of claim 1 further comprising:
    bitwise comparing the instruction with at least one pair of associated match values, wherein the pair of match values represents a combinational logic function to be applied against the instruction; and
    in response to a determination that the bitwise comparison results in a successful match, selecting the instruction as a matched instruction.

10. The method of claim 9 wherein the step of bitwise comparing comprises, for instruction bit in a set of bits representing the instruction:
    obtaining an instruction bit;
    obtaining a corresponding first match value bit from a first match value in the pair of match values;
    obtaining a corresponding second match value bit from a second match value in the pair of match values; and
    determining a match result bit according to a preconfigured logic function in the processor.

11. The method of claim 10 further comprising:
    bitwise ANDing the match result bits to determine whether the bitwise comparison results in a successful match.

12. An apparatus for processing instructions within a pipelined processor, the apparatus comprising:
    fetching means for fetching an instruction;
    matching means for matching an instruction using at least one match condition, wherein the match condition identifies instructions which are to be placed;
    marking means for marking an instruction as a matched instruction by setting a match bit;
    passing means for passing the match bit associated with the matched instruction through the pipelined processor with the matched instruction;
    replacing means for replacing the matched instruction with an interrupt instruction; and
    patching means for patching the marked instruction, using an interrupt handler based on the interrupt instruction, by replacing the marked instruction with one or more other instructions that perform a same logical operation on data as the marked instruction.

13. The apparatus of claim 12 wherein the replacing means operated in response to a selection of an instruction interrupt mode.

14. The apparatus of claim 12 further comprising:
    executing means for executing the interrupt instruction in conjunction with a software interrupt vector to invoke a software interrupt handler.

15. The apparatus of claim 12 wherein an instruction is matched based on an instruction opcode.

16. The apparatus of claim 12 wherein an instruction is matched based on an instruction classification.

17. The apparatus of claim 16 wherein the instruction classification is selected from the group consisting of instruction type, instruction opcode, instruction operand source, or instruction operand destination.

18. The apparatus of claim 12 further comprising:
    fetching means for fetching a plurality of instructions from a memory or a cache;
    filtering means for filtering the plurality of instructions using match value against each instruction in the plurality of instructions to generate a subset of matched instructions; and
    first storing means for storing the matched instructions in an instruction cache.

19. The apparatus of claim 18 further comprising:
    setting means for setting a match bit for each matched instruction in the subset of matched instructions;
    second storing means for associatively storing the match bit for each matched instruction in the instruction cache with the matched instructions.

20. The apparatus of claim 12 further comprising:
    comparing means for bitwise comparing the instruction with at least one pair of associated match values, wherein the pair of match values represents a combinational logic function to be applied against the instruction; and selecting means for selecting, in response to a determination that the bitwise comparison results in a successful match, the instruction as a matched instruction.

21. The apparatus of claim 20 wherein the comparing means comprises, for each instruction bit in a set of bits representing the instruction:

first obtaining means for obtaining an instruction bit;

second obtaining means for obtaining a corresponding first match value bit from a first match value in the pair of match values;

third obtaining means for obtaining a corresponding second match value bit from a second match value in the pair of match values; and determining means for determining a match result bit according to a preconfigured logic function in the processor.

22. The apparatus of claim 21 further comprising:

ANDing means for bitwise ANDing the match result bits to determine whether the bitwise comparison results in a successful match.

23. A computer program product in a computer-readable medium for use in a data processing system for processing instructions within a pipelined processor, the computer program product comprising:

instructions for fetching an instruction;

instructions for matching a fetched instruction using at least one match condition, wherein the match condition identifies instructions which are to be patched;

instructions for marking an instruction as a matched instruction by setting a match bit;

instruction for passing the match bit associated with the matched instruction through the pipelined processor with the matched instruction;

instructions for replacing the matched instruction with an interrupt instruction; and instructions for patching the marked instruction, using an interrupt handler based on the interrupt instruction, by replacing the marked instruction with one or more other instructions that perform a same logical operation on data as the marked instruction.

24. The computer program product of claim 23 wherein the matched instruction is replaced in response to a selection of an instruction interrupt mode.

25. The computer program product of claim 23 wherein the interrupt instruction is executed in conjunction with a software interrupt vector to invoke a software interrupt handler.

26. The computer program product of claim 23 wherein an instruction is matched based on an instruction opcode.

27. The computer program product of claim 23 wherein an instruction is matched based on an instruction classification.

28. The computer program product of claim 27 wherein the instruction classification is selected from the group consisting of instruction type, instruction opcode, instruction operand source, or instruction operand destination.

29. A method for processing instructions within a pipelined processor, the method comprising the steps of:

fetching an instruction;

matching the instruction based on an opcode of the instruction;

setting a match bit based on a result of the matching;

selecting one of the opcode of the instruction and an interrupt opcode based on the value of the match bit and whether or not an interrupt mode is selected, wherein the selected opcode is output as a selected opcode; and outputting the match bit and the selected opcode to an instruction scheduling unit.

30. An apparatus for processing instructions within a pipelined processor, comprising:

an instruction match facility;

an instruction cache coupled to the instruction match facility;

an instruction decode unit coupled to the instruction cache; and an instruction scheduling unit coupled to the instruction decode unit, wherein the instruction match facility matches a fetched instruction based on an opcode of the fetched instruction and outputs opcode instruction bits along with a match bit to the instruction cache, the instruction cache outputs the match bit and the opcode instruction bits to the instruction decode unit, the instruction decode unit selects one of the opcode of the instruction and an interrupt opcode based on the match bit and the assertion of an interrupt mode select signal, the selected opcode being output to the instruction scheduling unit along with the match bit.

* * * * *

UNITED STATES PATENT AND TRADEMARK OFFICE
CERTIFICATE OF CORRECTION

PATENT NO. : 6,631,463 B1
APPLICATION NO. : 09/436103
DATED : October 7, 2003
INVENTOR(S) : Floyd et al.

Page 1 of 1

It is certified that error appears in the above-identified patent and that said Letters Patent is hereby corrected as shown below:

Col. 7, line 42: after "reference" delete "not" and insert --now--

Col. 9, line 66: after "for" insert --each--.

Col. 10, line 17: after "be" delete "placed" and insert --patched--.

Col. 10, line 31: after "means" delete "operated" and insert --operates--.

Col. 10, line 49: after "using" insert --a--.

Col. 11, line 31: before "for" delete "instruction" and insert --instructions--.

Signed and Sealed this

Fourteenth Day of August, 2007

JON W. DUDAS
*Director of the United States Patent and Trademark Office*